United States Patent
Hertzberg et al.

(10) Patent No.: US 9,384,001 B2
(45) Date of Patent: Jul. 5, 2016

(54) CUSTOM CHAINING STUBS FOR INSTRUCTION CODE TRANSLATION

(75) Inventors: Ben Hertzberg, Santa Clara, CA (US); Nathan Tuck, Corvallis, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 636 days.

(21) Appl. No.: 13/586,700

(22) Filed: Aug. 15, 2012

(65) Prior Publication Data

US 2014/0052962 A1    Feb. 20, 2014

(51) Int. Cl.
G06F 9/44 (2006.01)
G06F 9/30 (2006.01)
G06F 9/40 (2006.01)
G06F 9/32 (2006.01)
G06F 9/38 (2006.01)

(52) U.S. Cl.
CPC ............ *G06F 9/30174* (2013.01); *G06F 9/322* (2013.01); *G06F 9/3808* (2013.01)

(58) Field of Classification Search
None
See application file for complete search history.

(56) References Cited

U.S. PATENT DOCUMENTS

| | | | |
|---|---|---|---|
| 2002/0108103 A1* | 8/2002 | Nevill | G06F 9/30101 717/139 |
| 2003/0033507 A1* | 2/2003 | McGrath | G06F 9/30032 712/225 |
| 2003/0140245 A1* | 7/2003 | Dahan | G06F 9/30047 713/190 |
| 2004/0225869 A1 | 11/2004 | Pagni et al. | |
| 2005/0086650 A1 | 4/2005 | Yates, Jr. et al. | |
| 2006/0259744 A1* | 11/2006 | Matthes | 712/220 |
| 2008/0141011 A1 | 6/2008 | Zhang et al. | |
| 2009/0204785 A1 | 8/2009 | Yates, Jr. et al. | |
| 2013/0311752 A1* | 11/2013 | Brauch et al. | 712/208 |

FOREIGN PATENT DOCUMENTS

| | | |
|---|---|---|
| TW | I284281 | 7/2007 |
| WO | 2012103209 | 8/2012 |

\* cited by examiner

*Primary Examiner* — Michael Sun

(57) ABSTRACT

A processing system includes a microprocessor, a hardware decoder arranged within the microprocessor, and a translator operatively coupled to the microprocessor. The hardware decoder is configured to decode instruction code non-native to the microprocessor for execution in the microprocessor. The translator is configured to form a translation of the instruction code in an instruction set native to the microprocessor and to connect a branch instruction in the translation to a chaining stub. The chaining stub is configured to selectively cause additional instruction code at a target address of the branch instruction to be received in the hardware decoder without causing the processing system to search for a translation of additional instruction code at the target address.

20 Claims, 9 Drawing Sheets

FIG. 6

```
           CHAINING STUB 64A' commit state
counter = counter – 1
if counter = 0 then
  set arg = 0
  jump to chain_base(arg)
else
  jump to IP and invoke HW decoder
endif
```

FIG. 8

```
           CHAINING STUB 64A"

commit state
jump to IP and invoke HW decoder
```

CUSTOM CHAINING STUBS FOR INSTRUCTION CODE TRANSLATION

BACKGROUND

A computer, smartphone, or other device may be configured to execute code compiled to the native instruction set of its microprocessor, in addition to certain non-native instruction sets. When encountered by the microprocessor, blocks of non-native instructions may be translated to native instructions and may also be optimized—e.g., to increase speed of execution. Non-native instructions typically will not be translated until they are encountered. Accordingly, it will often be the case that a block of code undergoing translation could include various branch instructions to additional code still awaiting translation. In that event, a chaining stub may be used at every branch instruction that targets untranslated code. The chaining stub may direct the system to search an instruction cache for an existing translation of the branch target, and, if a translation is found, to redirect the instruction pointer to that translation. If the translation is not found, then the non-native code block may be submitted for translation and/or executed in an alternative manner. However, the search for pre-existing translations may be undesirably slow in some scenarios.

BRIEF DESCRIPTION OF THE DRAWINGS

FIG. 6 shows aspects of a custom chaining stub in accordance with an embodiment of this disclosure.

FIG. 8 shows aspects of another custom chaining stub in accordance with an embodiment of this disclosure.

DETAILED DESCRIPTION

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree. The claims appended to this description uniquely define the subject matter claimed herein. The claims are not limited to the example structures or numerical ranges set forth below, nor to implementations that address the herein-identified problems or disadvantages of the current state of the art.

Figure 1:
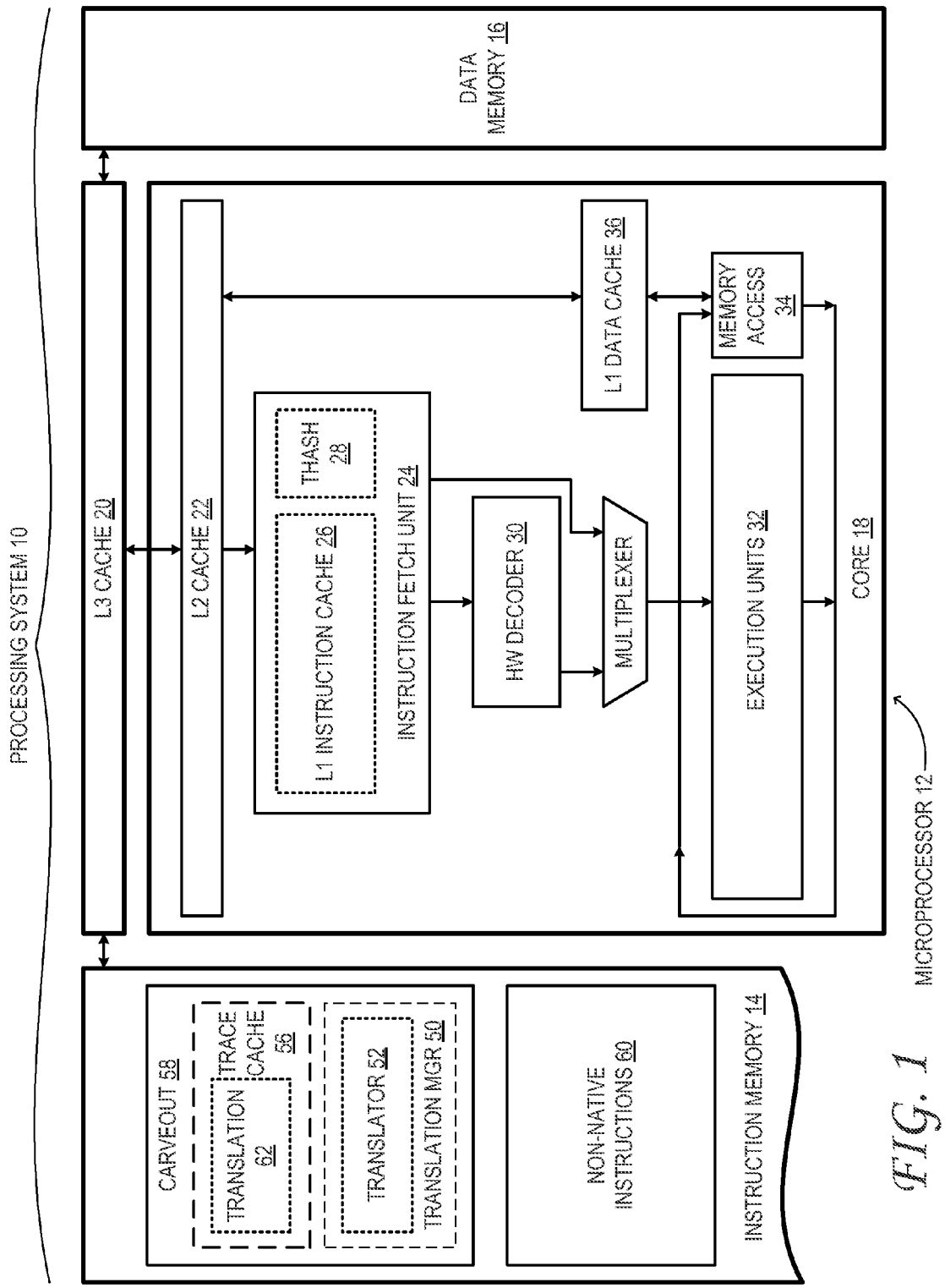
FIG. 1 schematically shows an example processing system in accordance with an embodiment of this disclosure.

FIG. 1 shows aspects of an example processing system 10—a central processing unit or graphics processing unit of a personal computer, game system, or smartphone, for example. The illustrated processing system includes microprocessor 12, which is operatively coupled to instruction memory 14 and to data memory 16. The microprocessor of FIG. 1 includes core 18. Although the drawing shows only one microprocessor core, every aspect of this disclosure is consistent with multi-core processors and processing systems.

Instruction memory 14 and data memory 16 may each be readable and writable by the microprocessor through a hierarchical memory cache system. In the illustrated embodiment, the memory cache system includes an off-core, level-three (L3) cache 20 and an on-core, level-two (L2) cache 22, in addition to instruction- and data-specific level-one (L1) caches, as described below. In other embodiments, the memory cache system may include any number of levels, with the levels residing on- or off-core and on- or off-chip. The memory cache system may be operatively coupled to a memory controller (not shown in the drawings) which can also be on- or off-chip. Embodied in random-access memory of any suitable variant, the instruction and data memories may correspond to different physical memory structures or to different parts of the same physical memory structure. In some embodiments, the instruction and data memories may also include read-only memory (ROM).

Continuing in FIG. 1, core 18 includes instruction fetch unit (IFU) 24, which is configured to retrieve instructions from instruction memory 14. The instruction to be retrieved at any given time may be determined by the current instruction pointer (IP), for example. In the embodiment illustrated in FIG. 1, the IFU includes L1 instruction cache 26 for caching the instructions retrieved. The IFU may also include translation-address cache (THASH) 28, which is described hereinafter.

IFU 24 may be configured to retrieve instruction code of various forms. In addition to instructions natively executable by the execution units of core 18, the instruction fetch unit may also retrieve instructions compiled to a non-native instruction set architecture (ISA). Such non-native instructions may require decoding or translation into the native ISA to be recognized by the execution units. To this end, processing system 10 includes hardware decoder 30. When the IFU retrieves a non-native instruction, it routes that instruction to execution units 32 through the hardware decoder. When it retrieves a native instruction, that instruction is routed directly to the execution units, by-passing the hardware decoder. The execution units may include integer and/or floating-point componentry in the embodiments here contemplated.

Hardware decoder 30 is a logic structure arranged in core 18 and configured to selectively decode instructions for execution in the core. In particular, the hardware decoder decodes non-native instructions retrieved by IFU 24. The hardware decoder parses op-codes, operands, and addressing modes of the non-native instructions, and creates a functionally equivalent set of native instructions.

Continuing in FIG. 1, execution units 32 receive natively executable instructions, either from IFU 24 or from hardware decoder 30. In one embodiment, microprocessor 12 may be a so-called in-order processor, in which instructions are retrieved and executed in substantially the same order—i.e., without resequencing.

As instructions are executed in the execution units of core 18, a sequence of logical and/or arithmetic results evolves therein. The write-back logic of the execution units stores these results in the appropriate registers of the core. In some embodiments, memory access 34 has the exclusive task of enacting store and load operations to and from data memory 16, via L1 data cache 36.

Figure 2:
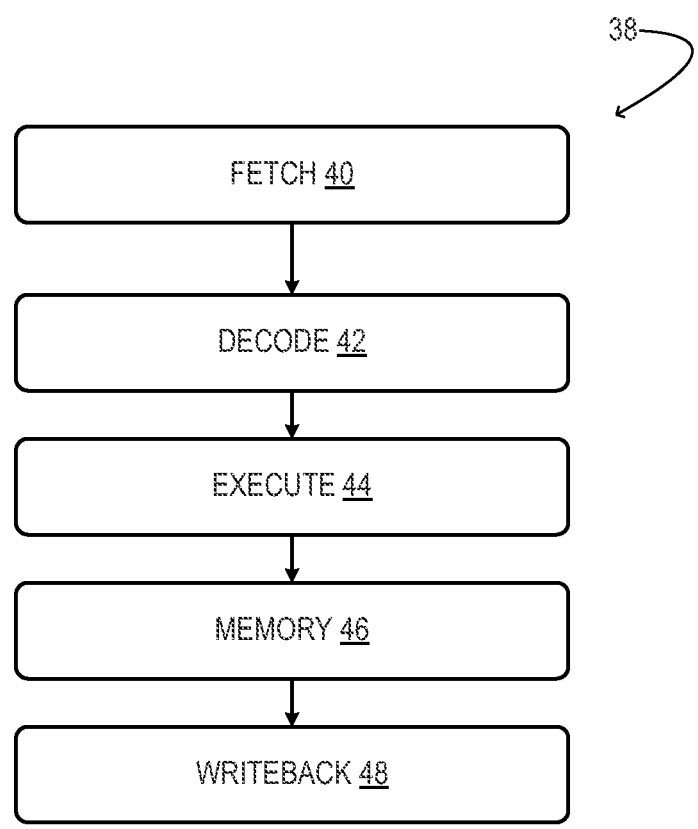
FIG. 2 schematically shows an example processing pipeline in accordance with an embodiment of this disclosure.

The basic functionality of processing system 10 can be represented in the form of a processing pipeline. FIG. 2 schematically shows an example processing pipeline 38. At fetch stage 40, IFU 24 reads a non-native instruction from instruction memory 14. At decode stage 42, hardware decoder 30 decodes the non-native instruction into a corresponding native instruction or sequence of native instructions. At execute stage 44, the execution units compute a logical or numeric result of the instruction. At memory stage 46, data memory 16 is read from or written to, based on the result of the instruction. At write-back stage 48, the appropriate register of the microprocessor core is written to, again based on the result of the instruction.

In some scenarios, pipeline 38 may process only one instruction at a time. The instruction being processed may occupy only one stage of the pipeline, leaving the remaining stages unused during one or more clock cycles. For increased instruction throughput, two or more stages of the pipeline may be used simultaneously, to process two or more instructions. In ideal 'scalar' execution, a first instruction may be fetched, a second instruction decoded, a result of a third instruction computed, that of a fourth instruction committed to memory, and that of a fifth instruction written back to the register file, all in the same clock cycle. No aspect of FIG. 2 should be understood in a limiting sense, for numerous variants are contemplated as well. For instance, execute stage 44 may precede memory stage 46 in some processing systems.

As noted above, processing system 10 may be configured to execute instructions conforming to one or more non-native ISAs in addition to the native ISA of microprocessor 12. One illustrative example of a non-native ISA that processing system 10 may be configured to execute is the 64-bit Advanced RISC Machine (ARM) instruction set; another is the x86 instruction set. Indeed, the full range of non-native ISAs here contemplated includes reduced instruction-set computing (RISC) and complex instruction-set computing (CISC) ISAs, very long instruction-word (VLIW) ISAs, and the like. The ability to execute selected non-native instructions provides a practical advantage for the processing system, in that it may be used to execute code compiled for pre-existing processing systems.

Returning now to FIG. 1, hardware decoder 30 provides the basic logic structure needed to convert a non-native instruction into a functionally equivalent series of native instructions. Processing throughput may be limited, however, by the speed at which the converted but non-optimized code from the hardware decoder may execute. Therefore, the processing system shown in FIG. 1 also includes translation manager 50. Like the hardware decoder, the translation manager parses the op-codes, operands, and addressing modes of non-native instructions, and creates a functionally equivalent series of native instructions. The translation manager, however, is primarily a software structure; it uses a programmed algorithm executed on core 18 to translate the non-native instructions. In the embodiment of FIG. 1, translator 52 is the core translation service of the translation manager; it may include a dynamic binary translator in one embodiment. The translator and other aspects of the translation manager may reside in instruction memory 14.

Through translator 52, non-native instructions 60 may be converted into a functionally equivalent block 62 of native instructions—i.e., a translation. Optionally and selectively, the translator may optimize as well as translate the specified block of non-native instructions. In some scenarios, the translation may be optimized for speed of execution in processing system 10. Alternatively, or in addition, the translation may be optimized to reduce power consumption on execution. In the embodiments considered herein, various modes of optimization may be available to the translator. These include features common in so-called out-of-order processing systems, such as register renaming and instruction re-ordering, where individual instructions of the translation are re-sequenced relative to corresponding instructions of the non-native block. These features are set forth as non-limiting examples; the translator may employ a wide variety of techniques to form translations. Moreover, it will be noted that the term 'block' as used herein can refer to a sequence of instructions of virtually any length; it is not limited to the so-called 'basic block' as known in the art.

In the illustrated embodiment, translation manager 50 also includes installer 54. The installer is a software layer that locates references to translated, non-native code blocks in instruction memory 14, and replaces them with references to the corresponding translations.

In some embodiments, translation manager 50 may be configured to store completed translations in trace cache 56. In the embodiment illustrated in FIG. 1, the trace cache as well as the translation manager reside in carve-out 58—a private, secure portion of instruction memory 14. Each translation in the trace cache may be associated with the IPs of the corresponding block of non-native instructions from instruction memory 14. Translation-address cache (THASH) 28 is an on-core hardware redirector that allows IFU 24 to access the translations during execution.

More particularly, IFU 24, on retrieving a non-native instruction, may supply the address of that instruction to the THASH. The THASH correlates the address of the non-native instruction with the address of the corresponding translation, if such a translation exists. If there is a hit in the THASH, the address of the translation is returned to the IFU, which in turn retrieves the translation from trace cache 56 using that address. The translation is then piped through for execution in the execution units of core 18 without use of hardware decoder 30.

Figure 3:
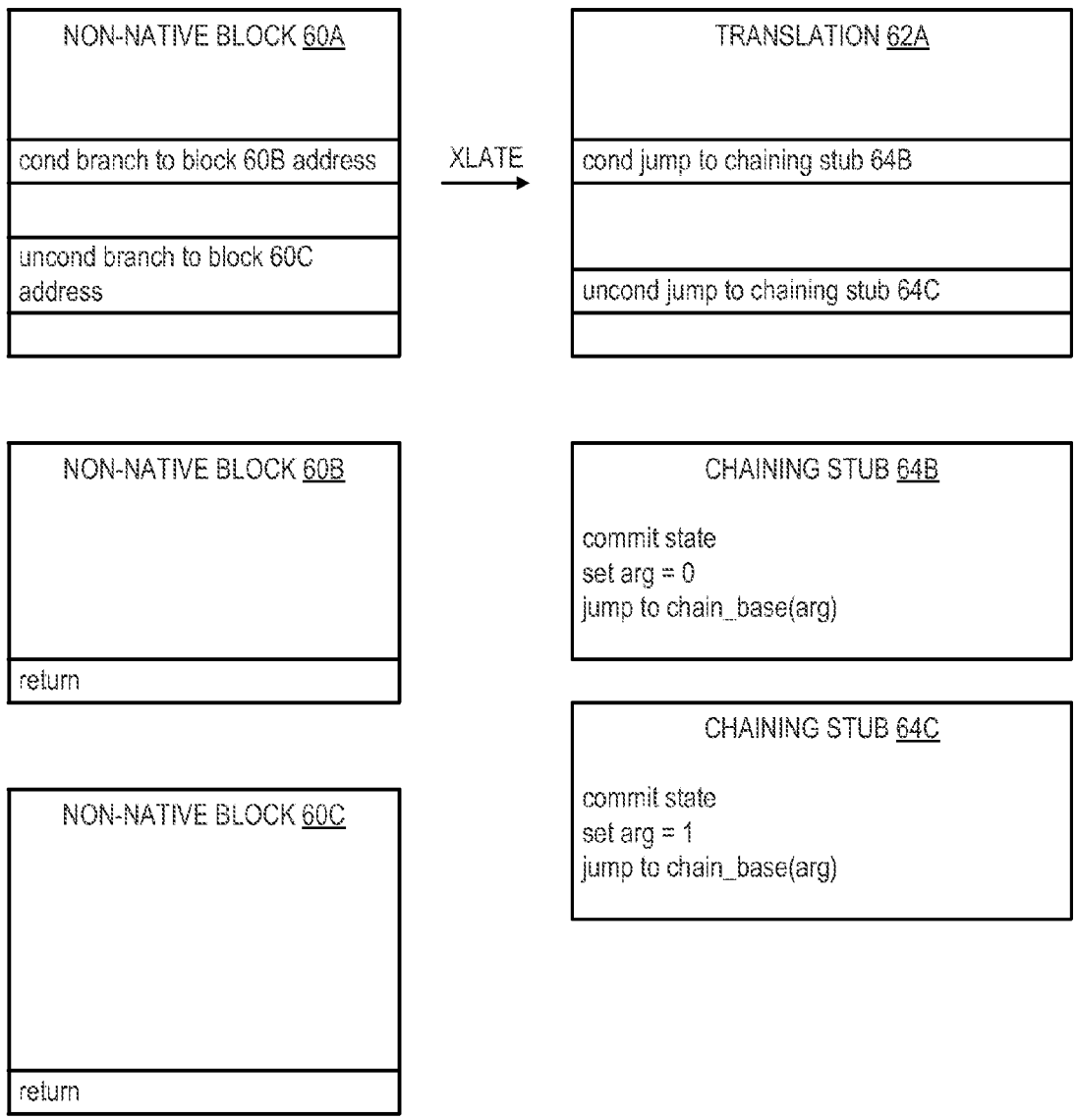
FIG. 3 shows aspects of an approach for translation chaining in accordance with an embodiment of this disclosure.

FIG. 3 shows aspects of one approach for translation chaining in one embodiment. The drawing shows three blocks of non-native instruction code: block 60A, block 60B, and block 60C. Any or all of the blocks may include conditional or unconditional branch instructions—e.g., branch to target address on carry clear, branch to target address on greater than or equal, branch always to target address, etc. In some instances, the target address of a branch instruction may be in the same block as the branch instruction itself. During translation of that block, the non-native branch instruction may be converted into a corresponding native branch instruction, which targets additional code in the same translation. In other instances, however, the target address of a branch instruction may be part of a different block. A branch instruction of this kind must be handled differently, because the additional code that it targets will not be found in the current translation. Furthermore, this additional code may or may not have been translated previously. Even if the additional code were previously translated, a mechanism would be needed to determine the entry point of the translation. And, if the additional code were not previously translated, then some action would have to be taken to initiate a translation, or to execute the additional code in some other manner.

In FIG. 3, for purposes of illustration, block 60A is the non-native code block currently being translated. Block 60B is a code block invoked via a conditional branch instruction from block 60A, and block 60C is a code block invoked via an unconditional branch instruction from block 60A. Translation 62A is a translation of block 60A. This translation may be formed by translator 52 of processing system 10, as described hereinabove. In translation 62A, each external branch instruction of corresponding non-native code block 60A is translated as a jump to a generic chaining stub 64—viz., generic chaining stub 64B or 64C. In particular, a conditional non-native branch instruction may translate to a conditional jump, and an unconditional non-native branch instruction may translate to an unconditional jump.

Each of the generic chaining stubs illustrated in FIG. 3 directs the processing system to take a series of actions. First, the processing system is directed to commit the state of the microprocessor. Next, the processing system is directed to construct an argument that numerically identifies the taken external branch of the parent translation. In the illustrated example, where there are only two external branches, the argument is set equal to zero in generic chaining stub 64B and equal to one in generic chaining stub 64C. Finally, the processing system is directed to jump to a chain base function 66, and to pass the constructed argument to that function.

Figure 4:
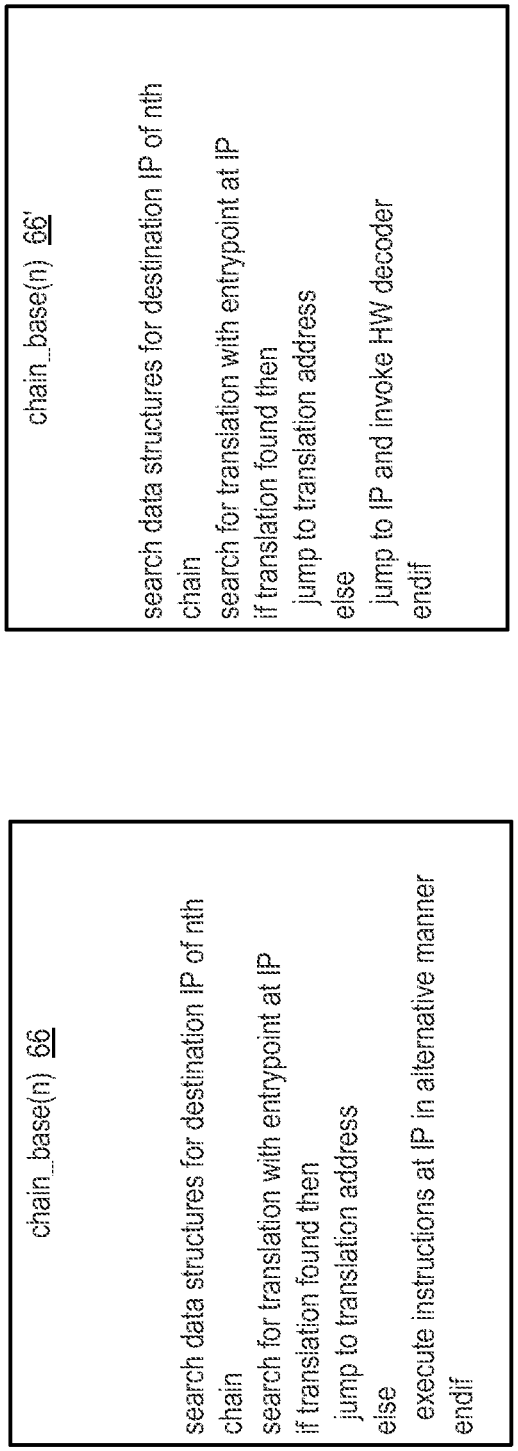
FIG. 4 shows aspects of an example chain base function in accordance with an embodiment of this disclosure.

FIG. 4 shows aspects of an example chain base function 66 in one embodiment. The chain base function receives the argument passed from the generic chaining stubs, and directs the processing system to search the data structures for the destination instruction pointer (IP) corresponding to the taken branch. The data structure mapping can be achieved in several ways. In one example, each translation installed in the trace cache has a corresponding primary data structure that contains information needed by the translation management system when executing, validating, or retranslating the translation. The native code for every translation records its native instruction pointer on entry to the translation, together with auxiliary information that can be used to search for a primary data structure associated with the translation. The chain base function uses this recorded information to initiate a search. Preferably the search would be via a direct pointer, but could alternatively include searching hash tables, linked lists, or other data structures. Once the primary data structure is found, the information passed in from the chaining stub indicates which substructure within the main data structure is to be examined. The destination instruction pointer is then extracted from this substructure.

The chain base function then directs the processing system to search for a translation having an entry point corresponding to the destination IP. If a matching translation is found, then a jump is made to the entry point of the found translation. Otherwise, the non-native instructions corresponding to the taken branch are executed in an alternative manner.

In one embodiment, the alternative manner of executing the additional, non-native instructions of the taken branch may include submitting the code block at the branch-target address for translation. In another embodiment, it may include executing the non-native instructions via a software-based interpreter. Compared to the latency of waiting for a translation of the additional code to be formed, or the slowness of executing the additional code via an interpreter, the time required to search the data structures for the destination IP and to check whether a translation exists may be negligible. However, other embodiments are envisaged in which hardware decoder 30 is used to execute the additional, non-native instructions of the taken branch. To this end, the chain base function may take the more particular form of function 66' of FIG. 4. In this function, failure to locate a translation corresponding to the found IP is followed by a jump to that IP. The hardware decoder is invoked to execute the non-native instructions at that address. The hardware decoder may execute the additional code of the taken branch much faster than an interpreter could, and without the latency of waiting for a translation to be formed. In such embodiments, the time required to find the IP and check whether a translation exists may no longer be negligible relative to the process flow that occurs when a suitable translation cannot be found.

Figure 5A:
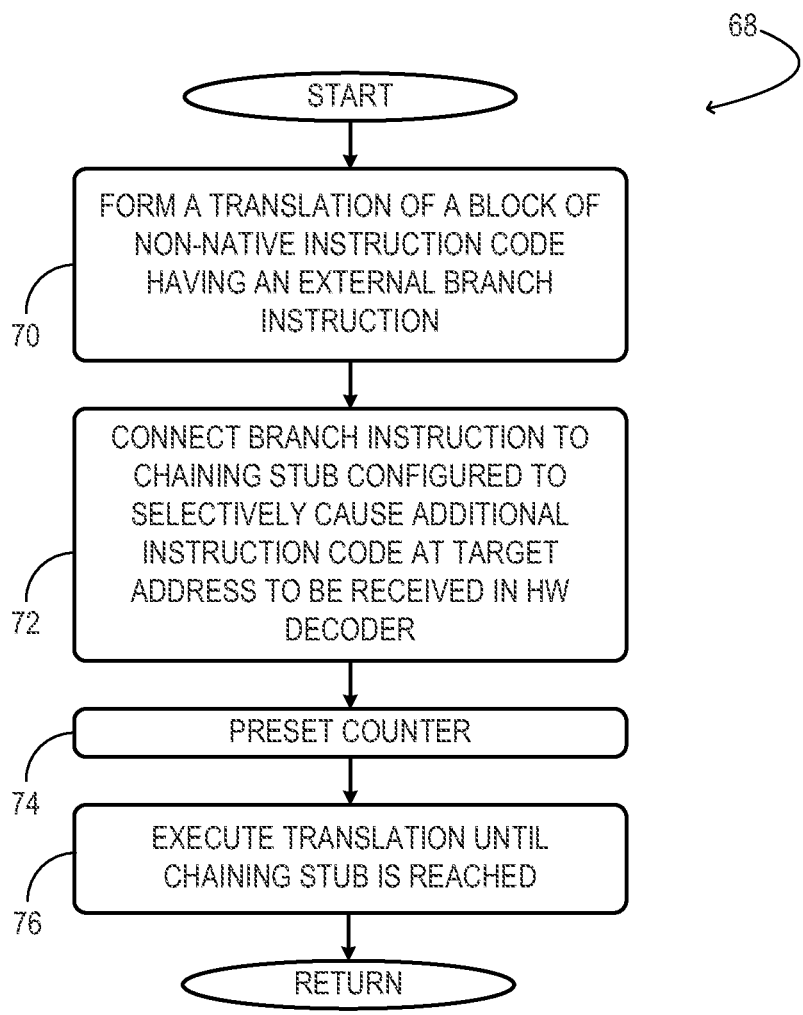
FIGS. 5A and 5B illustrate example methods to execute non-native instruction code in a processing system in accordance with an embodiment of this disclosure.

To address this issue and provide still other advantages, FIG. 5A illustrates an example method 68 to execute instruction code in a processing system. The methods illustrated in this disclosure are enabled by and described with continued reference to the configurations illustrated herein. It will be understood, however, that the methods here illustrated, and others within the scope of this disclosure, may be enabled by different configurations as well. The methods may be entered upon any time processing system 10 is operating, and may be executed repeatedly. Naturally, each execution of a method may change the entry conditions for a subsequent execution and thereby invoke complex decision-making logic. Such logic is fully contemplated in this disclosure. Further, some of the process steps described and/or illustrated herein may, in some embodiments, be omitted without departing from the scope of this disclosure. The indicated sequence of the process steps may not always be required to achieve the intended results, but is provided for ease of illustration and description. One or more of the illustrated actions, functions, or operations may be performed in parallel, or performed repeatedly, depending on the particular strategy being used.

At 70 of method 68, a translation of a block of non-native instruction code is formed in an instruction set native to the microprocessor. The translation may be formed via translation software of the processing system—e.g., translator 52. As noted above, the non-native code block may include at least one branch instruction with a target address external to the block. Accordingly, the translation formed may include at least one native branch instruction with a target address external to the translation.

At 72 at least one of the native branch instructions of the translation is connected to a custom chaining stub. The chaining stub is 'custom' in that is has the destination IP hardcoded into it. Therefore, the custom chaining stub is only usable for one direct target address—i.e., for one translation exit, generally speaking, rather than all translation exits. Nevertheless, the hardcoding aspect obviates any search for IP information, which may be expensive relative to translation execution time. In contrast to generic chaining stubs 64B and 64C of FIG. 3, the custom chaining stub of the present method is configured to selectively cause additional instruction code at target address to be received in the hardware decoder without causing the processing system to search for a translation of the additional instruction code. In one non-limiting embodiment, execution of the custom chaining stub may cause the additional instruction code to be received in the hardware decoder within a few (2 to 5) clock cycles of the microprocessor. Naturally, the external branch instruction referred to in this method may be one of a plurality of branch instructions in the translation, each with a target address external to the translation. In such embodiments, a corresponding custom chaining stub may be connected to any or all of the external branch instructions.

Although the custom chaining stub is only usable for one direct target address, it is possible to have more than one translation exit that exits to the same address. This scenario is common after loop unrolling, for example. Further, an implementation may optionally share stubs if there is a redundant target address, in order to save space.

In some embodiments, a counter may be provided—in microprocessor 12 or elsewhere in processing system 10—for each block of non-native code targeted by a branch instruction. Each counter may be used to keep track of the number of times that additional code at a given branch-target address is executed by the hardware decoder. In one particular embodiment, the counter may be a down counter that counts down to zero starting at the desired number of times that the additional code block should be executed in the hardware decoder before a translation is searched for. Accordingly, at 74 of method 68, a counter of this kind is preset to the desired value. Finally, at 76, the translation formed at 70 is executed without using the hardware decoder, until the chaining stub is reached.

Figure 5B:
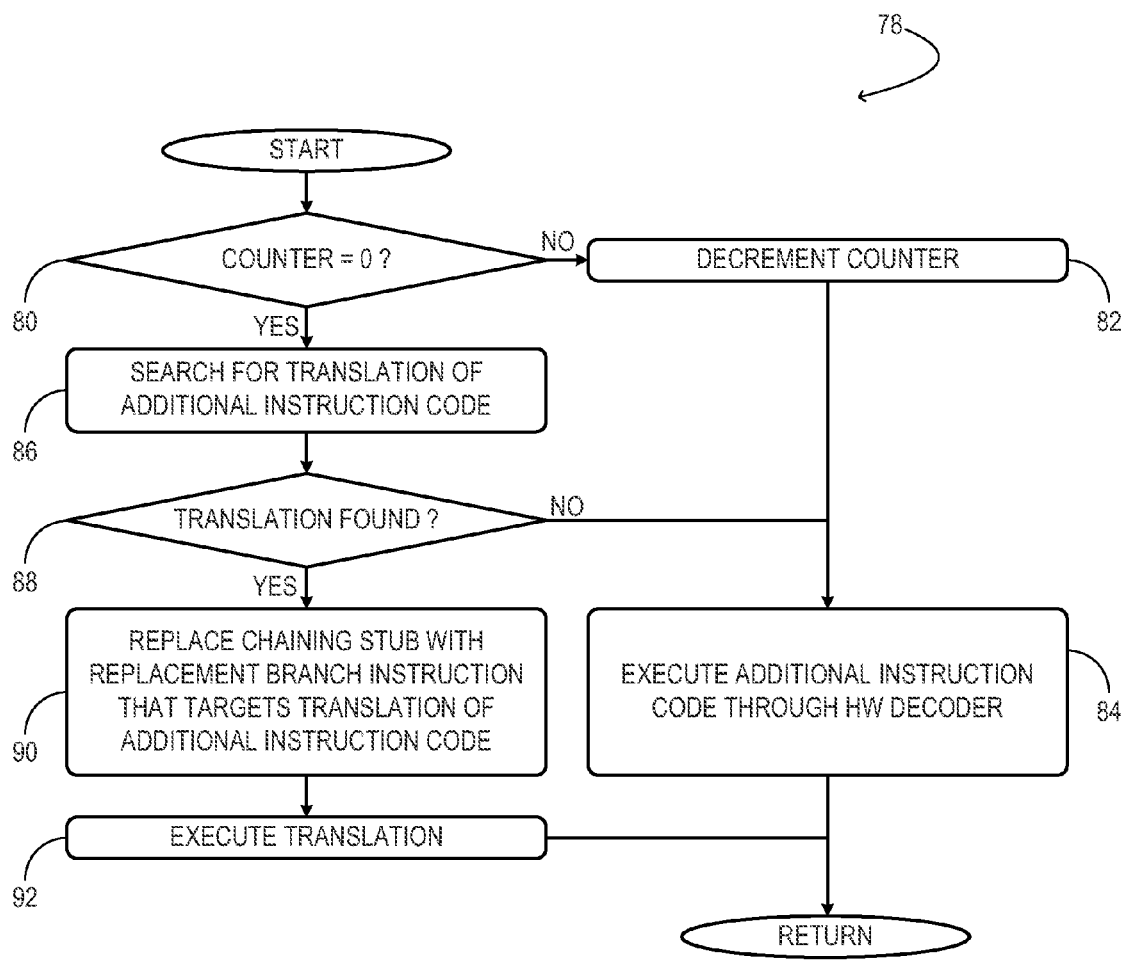

FIG. 5B illustrates another example method 78 to execute instruction code in a processing system. Method 78 is a companion to method 68 of FIG. 5A, in which a chaining stub is connected to a translation. Method 78 is enacted each time this chaining stub is encountered by the processing system. At 80 of method 78, it is determined whether the counter that was preset to a desired value in the foregoing method now equals zero. If the counter does not equal zero, then the method advances to 82, where the counter is decremented. From 82, the method continues to 84, where the additional instruction code at the target address is executed through the hardware decoder. However, if the counter equals zero, then the method advances to 86.

At 86, the processing system is directed to search for a translation of the additional instruction code at the branch-target address. In one embodiment, searching for the translation of the additional instruction code may include computing an argument to identify the taken branch instruction from among a plurality of external branch instructions of the translation. In this and other embodiments, searching for the translation of the additional instruction code may include computing the target address of the branch instruction—i.e., the architectural IP—and searching for an entry point of the additional instruction code based on the architectural IP. In one embodiment, searching for the entry point may include reading a translation address cache, such as THASH 28 of FIG. 1. In accordance with method 78, these actions may be deferred until after the additional instruction code has been executed at least once through the hardware decoder.

Continuing in FIG. 5B, at 88 it is determined whether a translation of the additional instruction code at the branch-target address has been found. If a translation of the additional instruction code has not been found, then the method advances to 84, where the additional instruction code is executed through the hardware decoder. However, if a translation has been found, then the method advances to 90. At 90, the chaining stub is replaced with a replacement branch instruction that targets the found translation of the additional instruction code. Then, at 92, the translation of the additional instruction code is executed natively—i.e., without using the hardware decoder.

FIG. 6 shows aspects of a custom chaining stub 64' that can be used with the methods above. In the illustrated embodiment, the custom chaining stub directs the processing system to decrement a counter each time the additional instruction code at the branch-target address is encountered. In other embodiments, the chaining stub may direct the processing system to increment instead of decrement the counter. In this manner, the chaining stub is configured to cause the additional instruction code to be received in the hardware decoder before it is invoked a threshold number of times. After the threshold number of executions, the chaining stub directs the processing system to search for a translation of the additional instruction code.

No aspect of the illustrated chaining stubs or associated methods should be understood in a limiting sense, for numerous variations are contemplated as well. For instance, although the chaining stub described above directs the processing system to search for the translation of the additional instruction code when a counter reaches a value of zero, the search could alternatively be triggered by overflow or underflow of the counter. In another example, a chaining stub may direct the processing system to search for a translation of the additional instruction code a first time that the additional instruction code is invoked. If the search is unsuccessful, then, when the additional instruction code is encountered a second or subsequent time, it may be received in the hardware decoder. The hardware decoder may continue to process the code each time it is encountered, until a desired threshold number of executions is reached, or until some other action triggers another search.

Figure 7A:
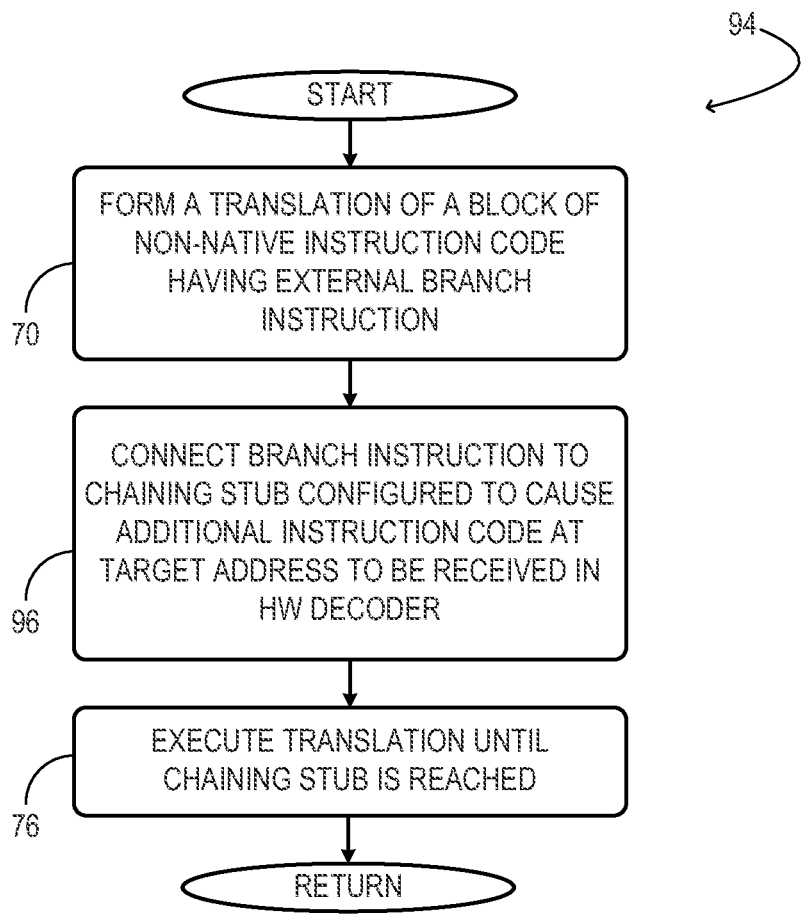
FIGS. 7A and 7B illustrate additional example methods to execute non-native instruction code in a processing system in accordance with an embodiment of this disclosure.

FIG. 7A illustrates another example method 94 to execute instruction code in a processing system. Method 94 is similar to method 68 of FIG. 5A, however, the counter preset step is omitted. Furthermore, at 96 the branch instruction is connected to a custom chaining stub configured to cause additional instruction code at the target address to be received—not necessarily selectively—in the hardware decoder.

Figure 7B:
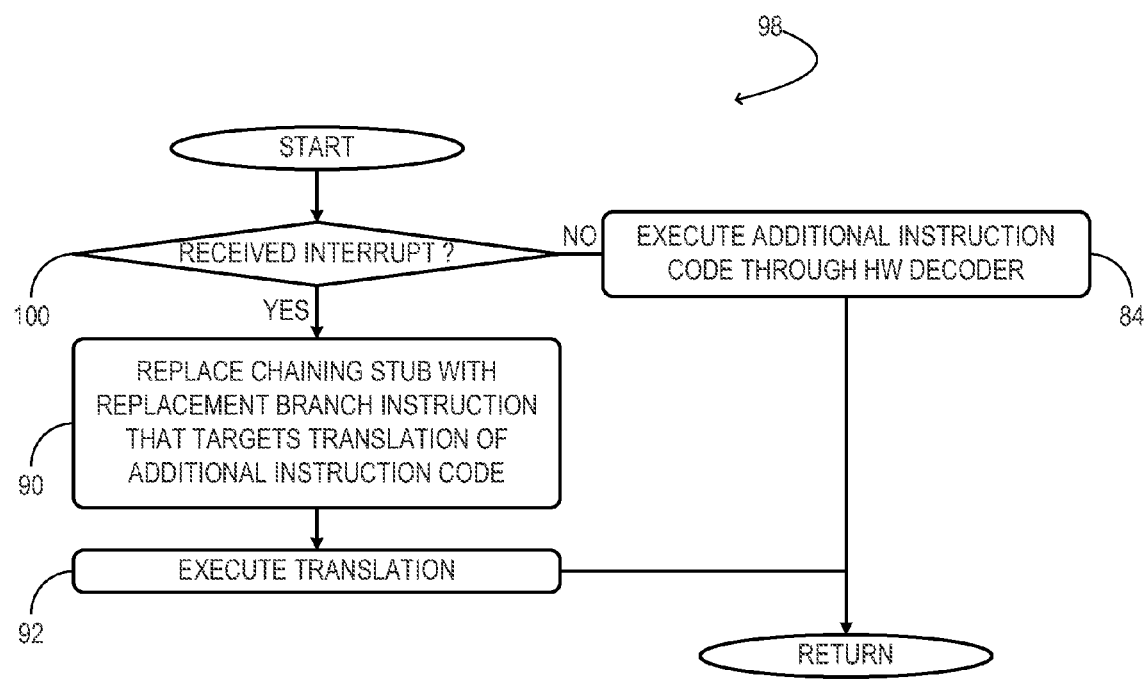

FIG. 7B illustrates a companion method 98 to execute instruction code in a processing system. Like method 78 of FIG. 5B, method 98 is enacted each time a custom chaining stub is encountered. At 100 of method 98 it is determined whether an interrupt has been received in the processing system. In one embodiment, the interrupt may be a timing interrupt. It may be raised periodically, at suitable intervals to check whether a previously unformed translation has been formed. In another embodiment, the interrupt may be raised by translator 52, to indicate that one or more new translations are available in trace cache 56.

Continuing in FIG. 7B, if the interrupt has not been received, then method 98 advances to 84, where the additional instruction code at the branch-target address is executed through the hardware decoder. However, if the interrupt has been received, then the method advances to 90, where the custom chaining stub is replaced with a replacement branch instruction that targets the translation of the additional instruction code. Then, at 92, the translation of the additional instruction code is executed without using the hardware decoder. In this manner, the additional instruction code is executed through the hardware decoder before the translation of the additional instruction code is formed. After the translation of the additional instruction code is formed, the translation of the additional instruction code is executed without using the hardware decoder. In some embodiments, replacement of the custom chaining stub at 90 need not be interrupt-driven. Instead, installer 54 may enact the replacement of custom chaining stubs in currently executing code—i.e., the installer may be configured to replace the custom chaining stub with a replacement branch instruction that targets a translation of the additional instruction code.

FIG. 8 shows aspects of a custom chaining stub 64" that can be used in the method above. Custom chaining stub 64" merely directs the processing system to commit the state of the microprocessor and then executes a jump to the branch target address, invoking the hardware decoder.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method of executing instruction code in a processing system comprising a microprocessor comprising a hardware decoder, the method comprising:

translating instruction code in a form non-native to the microprocessor into a translated instruction set native to the microprocessor using a translator, wherein the translated instruction set comprises a branch instruction with a target address external to the translation;

connecting the branch instruction to a chaining stub operable to selectively allow additional instruction code at the target address to be directly received and decoded in a hardware decoder, wherein the hardware decoder is operable to decode instruction code for execution in the microprocessor;

executing the translated instruction set until the chaining stub is reached; and decoding and executing the additional instruction code at the target address using the hardware decoder.

2. The method of claim 1, wherein the chaining stub is operable to direct the processing system to increment or decrement a counter each time the additional instruction code is executed through the hardware decoder.

3. The method of claim 2, wherein the chaining stub is operable to direct the processing system to search for a translation of the additional instruction code a first time that the additional instruction code is encountered, and further causes the additional instruction code to be received in the hardware decoder subsequent to the first time that the additional instruction code is encountered.

4. The method of claim 2, wherein the chaining stub is operable to allow additional instruction code to be received and decoded in the hardware decoder before the additional instruction code is encountered a threshold number of times, and to further direct the processing system to search for a translation of the additional instruction code after the additional instruction code is encountered the threshold number of times.

5. The method of claim 1 further comprising:
replacing the chaining stub with a replacement branch instruction that targets a translation of the additional instruction code.

6. The method of claim 1, wherein the branch instruction is one of a plurality of branch instructions in the translation with target addresses external to the translation, and wherein a chaining stub operable to selectively allow additional instruction code to be received in the hardware decoder is connected to each of the branch instructions.

7. The method of claim 1, wherein execution of the chaining stub causes the additional instruction code to be received in the hardware decoder within two to five clock cycles of the microprocessor.

8. The method of claim 3, wherein the search for a translation of the additional instruction code comprises computing an argument to identify the branch instruction from among a plurality of branch instructions in the translation.

9. The method of claim 3, wherein the search for a translation of the additional instruction code comprises computing the target address of the branch instruction.

10. The method of claim 3, wherein the search for a translation of the additional instruction code comprises searching for an entry point in the translation of the additional instruction code.

11. The method of claim 10 wherein the search for the entry point comprises reading a translation address cache of the microprocessor.

12. The method of claim 1 further comprising:
after the additional instruction code is decoded and executed using the hardware decoder at least once performing the following:
computing an argument to identify the branch instruction from among a plurality of branch instructions in the translation;
computing the target address of the branch instruction; and
searching for an entry point in a translation of the additional instruction code using the processing system.

13. A processing system comprising:
a microprocessor;
a hardware decoder within the microprocessor and configured to decode instruction code non-native to the microprocessor for execution in the microprocessor; and
a translator operatively coupled to the microprocessor, the translator configured to generate a translation of the instruction code in an instruction set native to the microprocessor and to associate a branch instruction with the translation with a chaining stub, wherein the chaining stub is configured to selectively allow additional instruction code at a target address of the branch instruction to be received in the hardware decoder directly instead of searching for a translation of additional instruction code at the target address.

14. The processing system of claim 13 further comprising an installer operatively coupled to the microprocessor, wherein the installer is configured to replace the chaining stub with a replacement branch instruction that targets a translation of the additional instruction code.

15. The processing system of claim 13 further comprising a translation address cache within the microprocessor, wherein the translation address cache is configured to map the target address of the branch instruction to a native address of a translation of the additional instruction code.

16. A method of executing instruction code in a processing system having a microprocessor and a hardware decoder in the microprocessor, the method comprising:
translating instruction code in a form non-native to the microprocessor into a translated instruction set native to the microprocessor using a translator, wherein the translated instruction set comprises a branch instruction with a target address external to the translation;
associating the branch instruction with a chaining stub operable to selectively allow additional instruction code at the target address to be directly received and decoded in a hardware decoder, wherein the hardware decoder is operable to decode instruction code for execution in the microprocessor;
generating a translation of the additional instruction code in the instruction set native to the microprocessor via a translation module; and
replacing the chaining stub with a replacement branch instruction that targets the translation of the additional instruction code.

17. The method of claim 16 further comprising executing the translation of the instruction code prior to reaching the chaining stub.

18. The method of claim 16 further comprising:
prior to the translation of the additional instruction code, executing the additional instruction code through the hardware decoder; and
following the translation of the additional instruction code, executing the translation of the additional instruction code using a different translation mechanism.

19. The method of claim 16, wherein the chaining stub is replaced by an installer module upon translation of the additional instruction code.

20. The method of claim 16 wherein replacement of the chaining stub is triggered by a timing interrupt.

* * * * *